(12) United States Patent
Lefebvre

(10) Patent No.: US 8,279,038 B2
(45) Date of Patent: Oct. 2, 2012

(54) METHOD FOR OPERATING A FIELD DEVICE IN AUTOMATION ENGINEERING WITH SPECIAL FUNCTIONALITIES

(75) Inventor: Martine Lefebvre, Blotzheim (FR)

(73) Assignee: Endress + Hauser Flowtec AG, Reinach (CH)

( * ) Notice: Subject to any disclaimer, the term of this patent is extended or adjusted under 35 U.S.C. 154(b) by 832 days.

(21) Appl. No.: 12/084,640

(22) PCT Filed: Nov. 3, 2006

(86) PCT No.: PCT/EP2006/068072
§ 371 (c)(1),
(2), (4) Date: Apr. 23, 2009

(87) PCT Pub. No.: WO2007/051837
PCT Pub. Date: May 10, 2007

(65) Prior Publication Data
US 2009/0210077 A1 Aug. 20, 2009

(30) Foreign Application Priority Data
Nov. 7, 2005 (DE) .......................... 10 2005 053 332

(51) Int. Cl.
*G05B 9/02* (2006.01)
(52) U.S. Cl. ...... 340/3.5; 702/104; 702/127; 340/539.1; 340/10.1; 340/5.5
(58) Field of Classification Search .................. 340/3.1, 340/3.5, 539.1, 517, 500, 679, 506, 531, 340/310.11, 665, 540, 572.1, 10.1, 10.6; 702/104, 127; 700/90, 110, 301, 81
See application file for complete search history.

(56) References Cited

U.S. PATENT DOCUMENTS 5,375,206 A 12/1994 Hunter

FOREIGN PATENT DOCUMENTS

| DE | 103 30 191 A1 | 2/2005 |
| EP | 1 071 253 A1 | 1/2001 |
| EP | 1 093 039 A | 4/2001 |
| WO | WO 2005/003935 A1 | 1/2005 |

OTHER PUBLICATIONS

The Open Group: Software License Use Management (XSLM), 1999, XP002238924, Zusammenf., pp. 13-17.

*Primary Examiner* — Nabil Syed
(74) *Attorney, Agent, or Firm* — Bacon & Thomas, PLLC

(57) ABSTRACT

A method for operating a field device of automation technology capable of special-functionalities, an enabling code set having a plurality of enabling code is managed in a superordinated, key-management unit. With the assistance of the enabling codes, special-functionalities can be enabled in field devices. Associated with individual enabling codes of the enabling code set is, in each case, an attribute, "free" or "blocked". If a special-functionality is needed, then an enabling code is transmitted to the field device, in case an enabling code with attribute "free" is present. Following transmission, the attribute of the transmitted enabling code is changed from free to blocked. The method permits enabling code to be used very flexably.

6 Claims, 3 Drawing Sheets

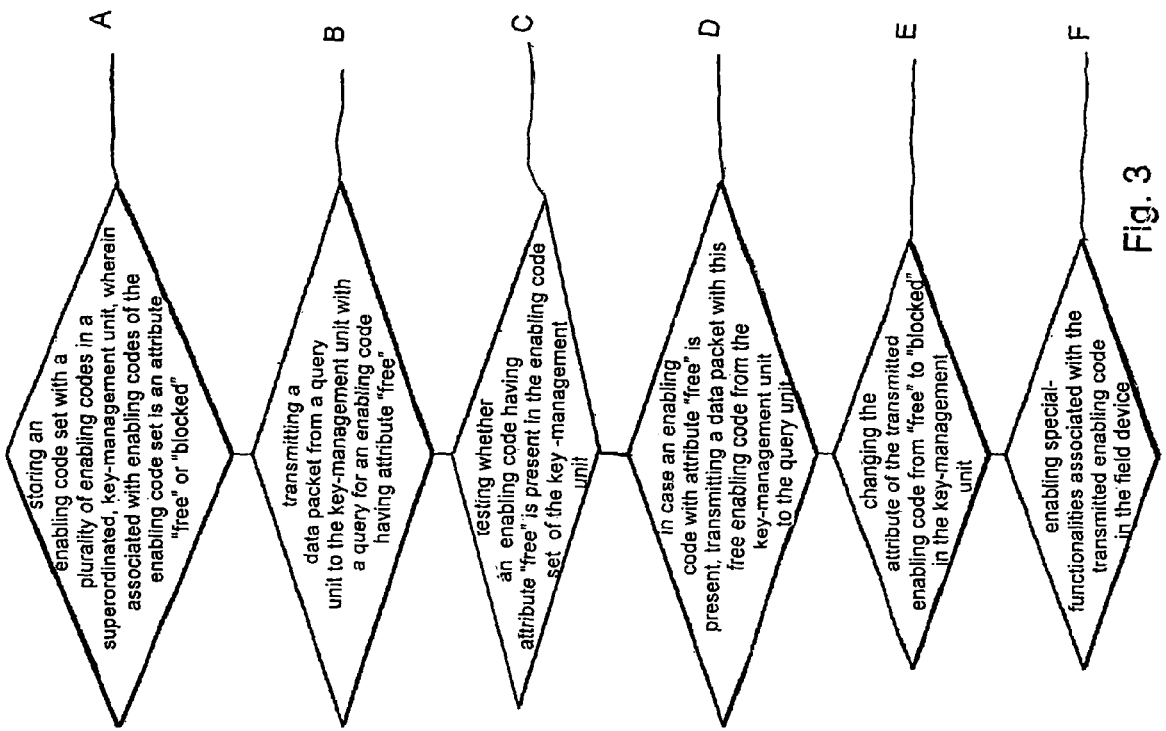

METHOD FOR OPERATING A FIELD DEVICE IN AUTOMATION ENGINEERING WITH SPECIAL FUNCTIONALITIES

TECHNICAL FIELD

The invention relates to a method for operating a field device of automation technology capable of special-functionalities.

BACKGROUND DISCUSSION

Field devices are often applied in automation technology for registering and/or influencing process variables. Examples of such field devices are fill level measuring devices, mass flow measuring devices, pressure- and temperature-measuring devices, etc., which, as sensors, register the corresponding process variables, fill-level, flow, pressure and temperature.

Field devices serving for influencing process variables are called actuators, which e.g., as valves, control the flow of a liquid in a section of pipeline or, as pumps, control the fill-level in a container.

A large number of such field devices are manufactured and sold by the firm, Endress + Hauser.

As a rule, field devices in modern manufacturing plants are connected via fieldbus systems (HART, Profibus, Foundation Fieldbus, etc.), with superordinated units (e.g. control systems or control units). These superordinated units serve, among other things, for process control, process visualizing, process monitoring as well as for start-up of the field devices. Referred to as field devices are, generally, also units, such as e.g. remote I/Os, gateways, and linking devices, which are directly connected to a fieldbus and serve for communication with the superordinated units.

Most often, fieldbus systems are integrated into enterprise networks. Therewith, process data or field-device data can be accessed from different areas of an enterprise.

For worldwide communication, company networks can also be connected with public networks, e.g. the Internet.

Modern field devices often include a standardized fieldbus interface, for communication with an open fieldbus system, and/or a proprietary interface, for manufacturer-specific communication with a service unit. Frequently, the service units are portable computers (laptops, Palm handhelds, etc.), such as are known from consumer-electronics (office- and home-computers).

Some field devices are capable of special-functionalities, which can be enabled with a corresponding hardware-key. Such hardware-keys are also known under the labels, "dongle", or F-chip, in the case of the firm, Endress + Hauser Flowtec. Such special-functionalities relate, frequently, to flow measuring devices having special functions, such as metering functions for batch-operations, diagnostic functions (predictive maintenance), viscosity measuring functions, density-measuring functions, etc.; examples include the Endress + Hauser products, Promass 83 (viscosity, special density, batching, predictive maintenance options), or Promag 53 (batching or ECC options).

In order to be able to use these functions, the user must obtain the corresponding dongle from the device manufacturer. In the case of a first-time use of a dongle in a field device, the serial number of the field device is transferred into the dongle and stored therein. Therewith, the dongle is, from then on, assigned to such field device, and cannot be used in any other field device, since, during turn-on of the device, there is always a checking of the serial number stored in the dongle. In the case of replacement of boards in the field device, this check procedure must be heeded.

For enabling the special software functionalities, the enabling code stored in the dongle is transmitted into the field device. The control program running in the field device ascertains from the enabling code the corresponding software functionality, which is to be enabled. The F-chip includes a PIC processor, which, among others things, is also responsible for encrypted transmission of the information. The different special functions are encoded bitwise in a bit-pattern (the metering function of a Promass-device receives another bit value than the metering function of a Promag-device). The ordered options are programmed into an F-chip during production. Upon turn-on of the device, the measurement amplifier "asks" the F-chip processor which options have been enabled and enables the corresponding parameters for configuring the options.

The unchangeable association between dongle and field device is frequently unsatisfactory for the plant operator. If the user needs, at a plurality of measuring points, e.g. in the case of start-up of a plant, a particular density functionality, then the user is compelled, in order to be able to use this functionality, to obtain a corresponding dongle for each flow measuring device. For many users, the effort is too expensive, to have to obtain a number of dongles for a quasi one-time use of a special-functionality.

Moreover, it is for the device manufacturer very cumbersome, when in the case of the repair of a field device the mainboard must be replaced, to assure, that the user can continue to use its already obtained dongle in the future. For this, the serial number of the old device must be transferred appropriately to the new mainboard.

Furthermore, it is also cumbersome for customers having a number of devices with dongle with different configurations, to keep replacement devices in inventory. In such case, one device per F-chip type, or one device with all F-chip options, must be stored.

Furthermore, it is very cumbesome, when a customer's dongle is misplaced, to provide an appropriate replacement-dongle.

SUMMARY OF THE INVENTION

An object of the invention is to provide an easy method for operating a field device of automation technology capable of special-functionalities, which method does not have the above-mentioned disadvantages, and which, especially, enables multiple utilization of an enabling code.

This object is achieved by a method for operating a field device of automation technology capable of special-functionalities, which can be enabled with assistance of an enabling code, including the method steps as follows:

Storing, in a superordinated, key-management unit, an enabling code set having a plurality of enabling codes, wherein associated with individual enabling codes of the enabling code set is an attribute "free" or "blocked";

transmitting a data packet from a query unit to the key-management unit with a query for an enabling code having attribute "free";

testing whether an enabling code having attribute "free" is present in the enabling code set of the key-management unit;

in case an enabling code with attribute "free" is present, transmitting a data packet with this free enabling code from the key-management unit to the query unit;

changing the attribute of the transmitted enabling code from "free" to "blocked" in the key-management unit; and enabling special-functionalities associated with the transmitted enabling code in the field device.

The query for an enabling code can be done either by the field device of concern or by a service unit.

Correspondingly, the free enabling code is transmitted either to the field device or to the service unit.

The key-management unit can be a control system or it can be a server associated with the device manufacturer.

BRIEF DESCRIPTION OF THE DRAWINGS

The invention will now be explained in greater detail on the basis of an example of an embodiment illustrated in the drawing, the figures of which show as follows:

FIG. 3 a flow diagram of the method of the invention.

DETAILED DISCUSSION

Figure 1:
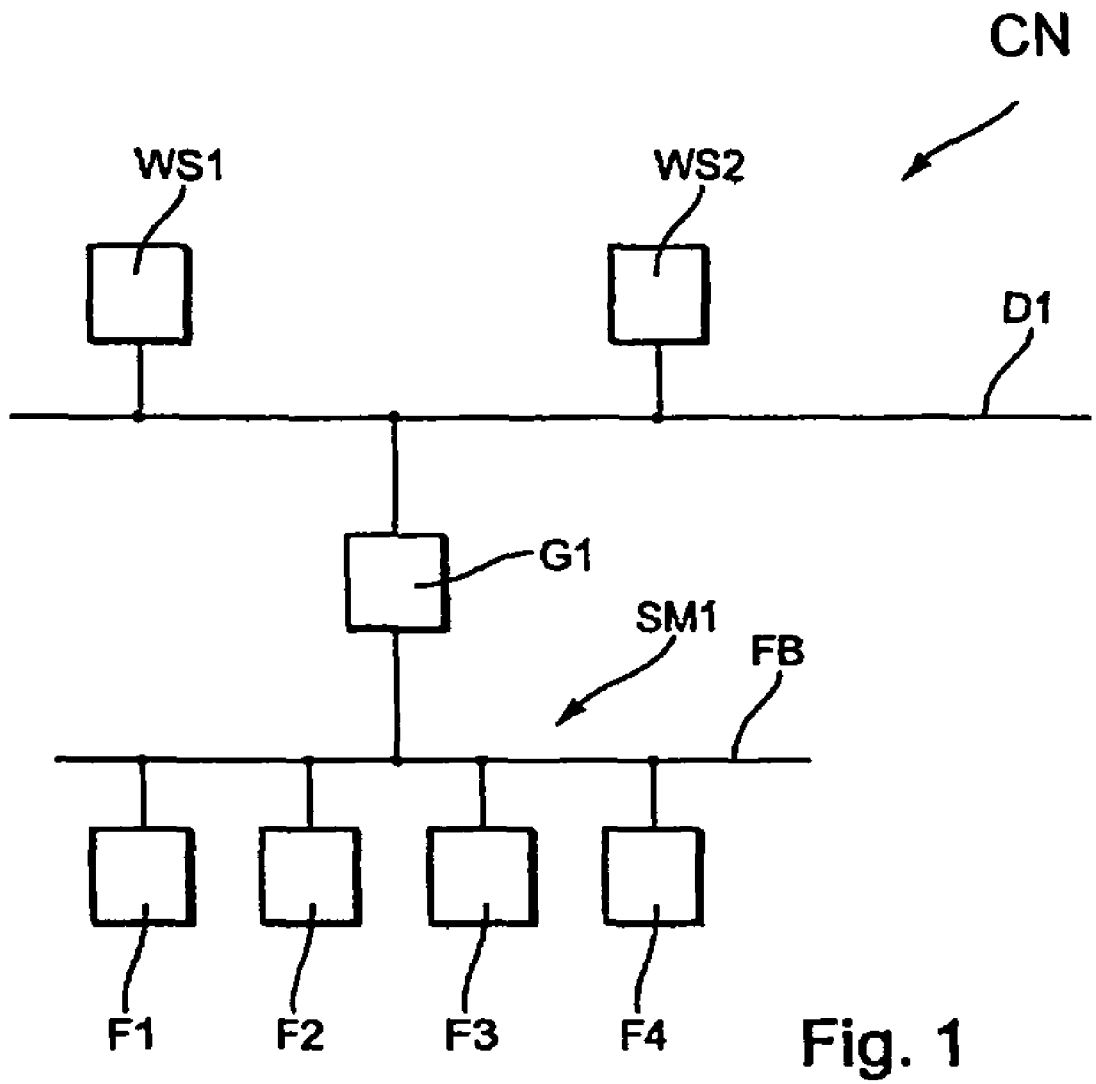
FIG. 1 in schematic presentation, a network of automation technology having a plurality of field devices.

FIG. 1 shows, in greater detail, a network of automation technology, or communication network, CN. Connected to a data bus D1 are a number of computer units (workstations) WS1, WS2. These computer units serve as superordinated units (control system or control unit) for, among other things, process visualizing, process monitoring, and engineering, as well as servicing and monitoring of field devices. Data bus D1 works e.g. according to the Profibus DP-standard or the HSE (High Speed Ethernet)-standard of Foundation fieldbus. Via a gateway G1, which is also referred to as a linking device, field controller or, also, segment-coupler, data bus D1 is connected with a fieldbus-segment SM1. Fieldbus-segment SM1 is composed of a plurality of field devices F1, F2, F3, F4, which are connected with one another via a fieldbus FB. The field devices F1, F2, F3, F4 can be sensors or actuators. Fieldbus FB works according to one of the known fieldbus standards, e.g. Profibus, Foundation fieldbus or HART.

Figure 2:
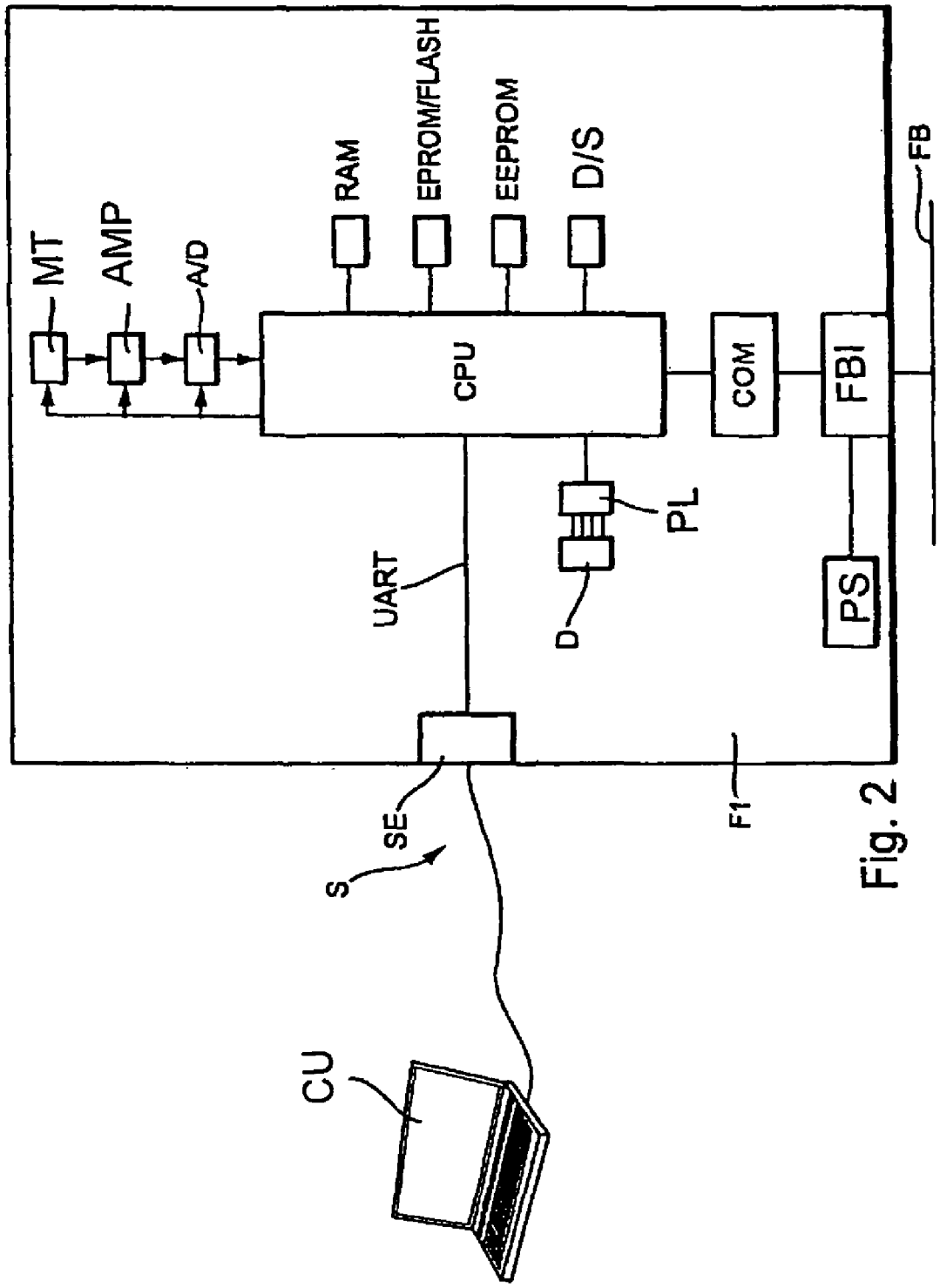
FIG. 2 a block diagram of a field device having an installed dongle.

FIG. 2 shows a block diagram of a field device, e.g. field device F1, of the invention in greater detail. A processor unit CPU for measured-value processing is connected, via an analog-digital converter A/D and an amplifier AMP, to a measuring transducer MT, which registers a process variable (e.g. pressure, flow or fill level). The processor unit CPU is connected with a number of memory units. A RAM-memory serves as temporary working memory, a non-volatile EPROM memory, or FLASH memory, as memory for the control program to be executed in the processor unit CPU, and an EEPROM-memory as memory for calibration- and start-parameter values, especially for the setup program of the processor unit CPU.

The control program defines the application-related functionality of the field device (measured value calculation, envelope curve evaluation, linearizing measured values, diagnostic tasks).

Furthermore, the processor unit CPU is connected with a display/service unit D/S (e.g. LCD-display with 3 to 5 push-buttons).

For communication with the fieldbus-segment SM1, the processor unit CPU is connected, via a communication controller COM, with a fieldbus interface FBI. A power supply PS delivers the necessary energy for the individual electronics components of the field device F1. The supply lines to the individual components are not drawn in, in order to avoid clutter.

In an alternative embodiment of the invention, voltage supply of the field device F1 is not via the fieldbus interface FBI but, instead, via a separate voltage supply.

A UART interface of the processor unit CPU is connected with a service plug-in connection SE, which, in the case of conventional field devices, serves as cable connection for a portable computer unit CU, e.g. a laptop. This interface on the field device is often also referred to as a service-interface S.

Via the computer unit CU and service-interface S, the field device F1 can be serviced and configured in simple manner.

A conventional dongle D is removably inserted at a separate plug-in location PL.

In the following, first the conventional method for enabling special-functionalities with the assistance of a known dongle will be explained.

The user obtains a dongle D for the desired special-functionality (e.g. density measurement) from the device manufacturer. Dongle D is inserted at the plug-in location PL in the field device F1. The application program, which is executed in the processor unit CPU, reads, first, from the dongle D, the data field for the serial number of the device for which the dongle is assigned. In the case of a first-time use, the dongle still has the default-serial number, # define DEFAULTPRODNUM, "???????????" set at the factory. In such a case, the serial number e.g. 3A041191000 of the relevant field device is transmitted into, and stored in, the dongle D.

This transmission is only possible, when, still, the default serial number, #define DEFAULTPRODNUM, "???????????" is found in the read-out. If a "real" serial number, e.g. 3A041191000, is read-out, then changing of the serial number is not permitted. Therewith, the dongle D is uniquely associated with the field device F1.

Upon turn-on of the field device (Power On or in the Boot Phase), there is first checked:

Is a hardware dongle present? If so, such is then checked as regards whether the data field with the serial number is still empty or not.

If a certain special-functionality, e.g. a diagnostic function, should be enabled, then the enabling code (key code) stored in the dongle is read out.

Via the control program, it is checked, whether the enabling code authorizes enabling the diagnostic function. When authorization is given, the diagnostic function is started and executed.

When no authorization is present, because the serial number stored in the dongle does not agree with the serial numbers or because no valid enabling code is present, then the corresponding diagnostic function is not executed.

Communication between dongle and device can be encrypted.

Also a number of enabling codes can be stored in the dongle. Theoretically, all enabling codes for a device can be combined with one another.

In the following, the method of the invention, which requires no hardware-key, will now be explained in greater detail.

In a first method step A, an enabling code set having a plurality of enabling codes is stored in a superordinated, key-management unit. The key-management unit can be provided e.g. in the computer unit WS1.

Associated with each enabling code of the enabling code set is an attribute, free or blocked.

In a method step B, a query is transmitted to the key-management unit, whether an enabling code with the attribute, free, is present.

Then, this query is tested in a method step C in the key-management unit.

In case a free enabling code is present, in method step D, the free enabling code is transmitted to the field device. With the assistance of the enabling code EN, enabling of the desired special-functionality is possible.

With the transmission of the free enabling code EN, the attribute of such enabling code in the key-management unit is changed from free to blocked in method step E. The key-management unit stores the serial numbers or unique identifiers (Tag Name, e.g.) of the devices, which have received an enabling code. Therewith, the customer can easily check which devices have received keys.

With the assistance of the enabling code EN, the desired special-functionality is enabled in the field device F1 in method step F.

In case all enabling codes are blocked in the key-management unit, naturally, no enabling codes can then be transmitted. A report results, "No free enabling code present". Via a Web-service, the user can obtain a new, supplemental, enabling code.

It is also possible to give back, to the key-management unit, enabling codes, which are no longer required.

The device must, in such case, be connected with the key-management unit. Via an appropriate user interface (similar to that used for the enabling), it is asked, whether the attribute of "blocked" is to be changed to "free". Thereafter, a communication between device and key-management unit takes place, in order to reset the enabling code in the device. In such case, a reset is automatically carried out in the device, and, thereafter, the functionality is no longer available in the field device.

Significant advantages available from the method of the invention include the following. An enabling code does not have to be obtained for each device. Special functionalities of different field devices can be utilized on the basis of a single enabling code, provided that the periods of utilization are offset in time from one another.

All possible combinations (however, only sensible combinations) of functionalities can be enabled, without overloading the order system at the device manufacturer.

With a number N of different enabling codes, a group of up to N devices can utilize the special-functionality. A hardware-dongle is no longer necessary.

Another option is to assign the enabling code a fixed time period. In case this attribute, "time period", is set, a countdown-counter must be started in the device for determining the remaining time.

The query to the key-management unit can be by the field device directly or, however, also, from the service unit. Via the service unit, a certain special-functionality can be called-up at a field device. If the device has an Ethernet interface, then a direct connection to the key-management unit is an option via usual protocols.

If the device is connected via a fieldbus to a control system or to an operating, or servicing, tool, such as e.g. the Fieldcare tool of the firm, Endress+Hauser, then the key-management unit can be a component of the Fieldcare tool, or an add-on module of the control system.

Assuming that the device has no fieldbus interface implemented (Batchline Dosimag/Dosimass instruments of the firm, Endress+Hauser) and only a service-interface is available, then a connection to the key-management unit is only possible via the service unit.

Correspondingly, the free enabling code is transmitted directly to the field device via the fieldbus FB or else to the service unit CU.

Via the service unit CU, via an appropriate Internet connection, also a server, e.g. an Endress+Hauser server, can be called, in order to receive an enabling code set to free.

The enabling can be accomplished e.g. via a Web-service.

The key-management unit collects the necessary information from the device, along with the customer request for enabling options XY, and sends such information to a Web-service, which produces the enabling code, possibly charges an account, and transmits the enabling code, via a secure transmission, to the key-management unit.

Communication between the service unit CU and the field device F1 can occur e.g. via the service-interface S, or, however, also, via the fieldbus FB.

In principle, involved here is a "floating license" for a plurality of field devices.

In an expanded method step C, it is also checked from the key-management unit, whether the field device has the required resources (hardware, or software version) to support the desired special-functionality. Thus, e.g. the ECC-option for a Promag-device makes no sense, when the required electrode is not mounted, and the option, viscosity measurement, is not possible, because not provided for, in the case of Promass-devices before Version 2.00.00.

Other options include a control system, which communicates with the key-management unit and makes measures available, when resources are not sufficient.

TABLE 1

| | |
|---|---|
| analog-digital converter | A/D |
| display/service unit | D/S |
| data bus | D1 |
| dongle | D |
| EPROM-memory | EPROM |
| fieldbus | FB |
| field device | F1 |
| field devices | F1, F2, F3, F4 |
| flash memory | FLASH |
| gateway | G1 |
| communication interface | CI |
| power supply | NT |
| processor unit | CPU |
| RAM-memory | RAM |
| computer unit | CU |
| computer units | WS1, WS2 |
| enabling code | EC |
| plug-in location | PL |
| amplifier | AMP |
| fieldbus interface | FBI |
| service plug connection point | SE |
| service interface | S |

The invention claimed is:

1. A method for operating a field device of automation technology capable of special-functionalities, which can be enabled with the assistance of an enabling code, comprising the steps of:

storing, in a superordinated, key-management unit, an enabling code set having a plurality of enabling codes, wherein associated with said enabling codes of said enabling code set is an attribute "free" or "blocked";

transmitting a data packet from a query unit to the key-management unit with a query for an enabling code having attribute "free";

testing whether an enabling code having attribute "free" is present in said enabling code set of the key-management unit;

in case an enabling code with attribute "free" is present, transmitting a data packet with this free enabling code from the key-management unit to the query unit;

changing the attribute of the transmitted enabling code from "free" to "blocked" in the key-management unit; and
enabling special-functionalities associated with the transmitted enabling code in the field device.

2. The method as claimed in claim 1, wherein:
in case an enabling code is present with attribute "free", it is additionally tested, whether the query unit has resources necessary for enabling the special-functionality; and
an enabling code is only transmitted, when the resources are present.

3. The method as claimed in claim 1, wherein:
said query unit is a field device or a service unit.

4. The method as claimed in claim 2, wherein:
transmitting of a free enabling code is to the field device or the service unit.

5. The method as claimed in claim 1, wherein:
the key-management unit serves as control system.

6. The method as claimed in claim 1, wherein:
the key-management unit is a computer unit at a manufacturer of the device.

* * * * *